United States Patent [19]

Arnoldsson

[11] 4,061,052

[45] Dec. 6, 1977

[54] DEVICE FOR SHIFTING BETWEEN FINE AND COARSE STEERING OF VEHICLES COMPRISING A FRONT AND A REAR VEHICLE PART

[75] Inventor: Eric Arnoldsson, Soderhamn, Sweden

[73] Assignee: Kockums Industri Aktiebolag, Soderhamn, Sweden

[21] Appl. No.: 682,011

[22] Filed: Apr. 30, 1976

[30] Foreign Application Priority Data

May 6, 1975 Sweden .............................. 75052670

[51] Int. Cl.² ............................................. B62D 1/20
[52] U.S. Cl. ................................... 74/498; 180/77 S
[58] Field of Search ............ 74/480 B, 480 R, 484 R, 74/494, 498; 180/77 S, 135

[56] References Cited

U.S. PATENT DOCUMENTS

| 1,717,681 | 6/1929 | Goodwin | 74/498 |
| 3,152,657 | 10/1964 | Ede et al. | 74/498 X |
| 3,249,174 | 5/1966 | Orwig | 18/153 |

*Primary Examiner*—Edgar W. Geoghegan

*Attorney, Agent, or Firm*—Stevens, Davis, Miller & Mosher

[57] ABSTRACT

A device for shifting between fine and coarse steering operations for articulated vehicles, comprising front and rear vehicle parts, is disclosed. Hydraulic steering cylinders are interposed between the vehicle parts for angularly displacing the parts relative to each other in order to accomplish the steering of the vehicle, and first and second valves are adapted to control the fluid flow to the steering cylinders in order to provide for the fine and coarse steering operations. In accordance with the invention, a shifting mechanism, which is shiftable between two positions, is adapted, in a first position, to connect an actuator, provided for controlling the steering of the vehicle, to the first valve, and is adapted, in a second position, to connect the actuator to the second valve. When the shifting mechanism is in the first position, a mutual angular displacement of the vehicle parts is obtained which is proportional to the movement of the actuator, while when the shifting mechanism is in its second position, a continuous angular displacement of the vehicle parts is obtained as long as the actuator is moved from a predetermined initial position.

23 Claims, 2 Drawing Figures

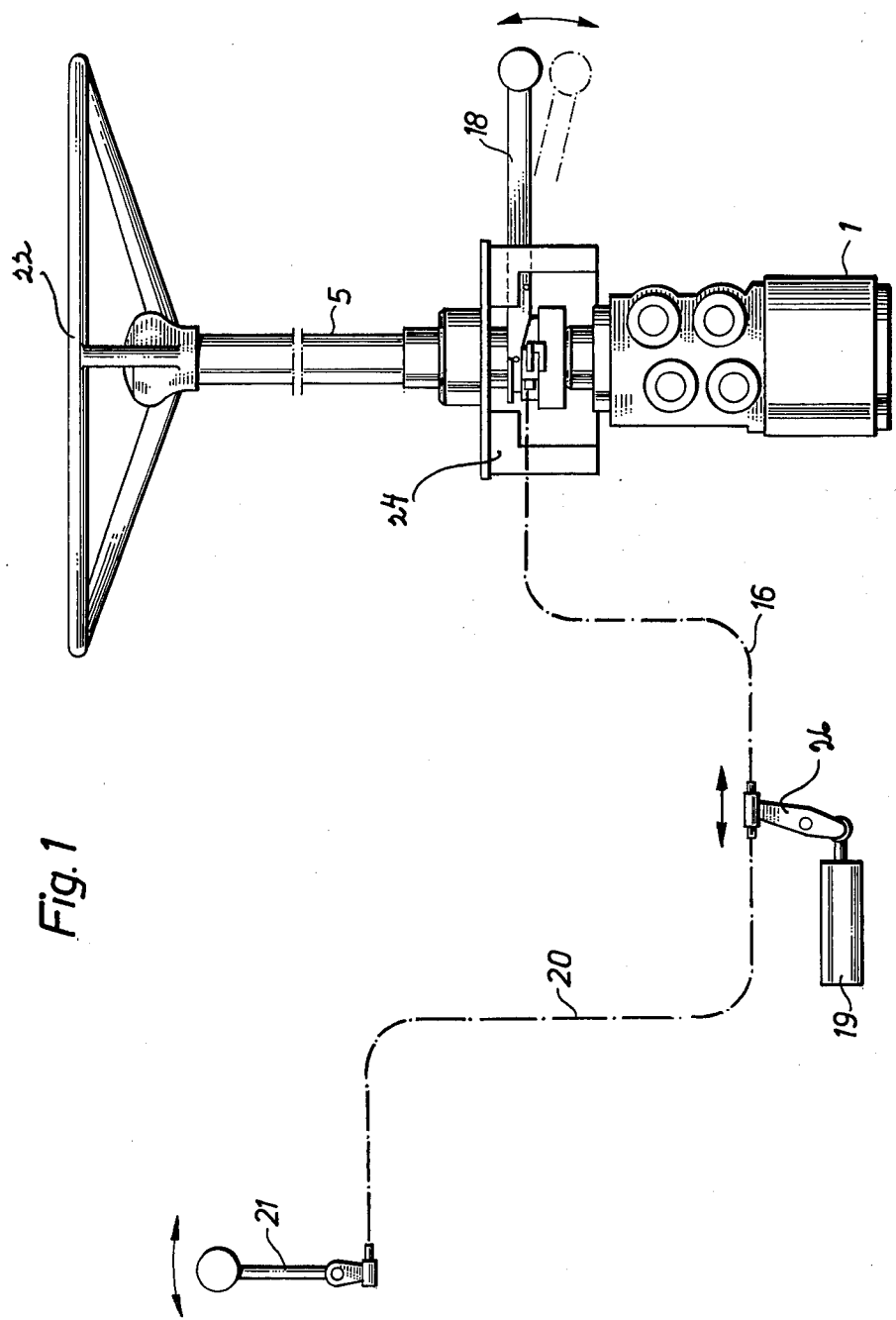

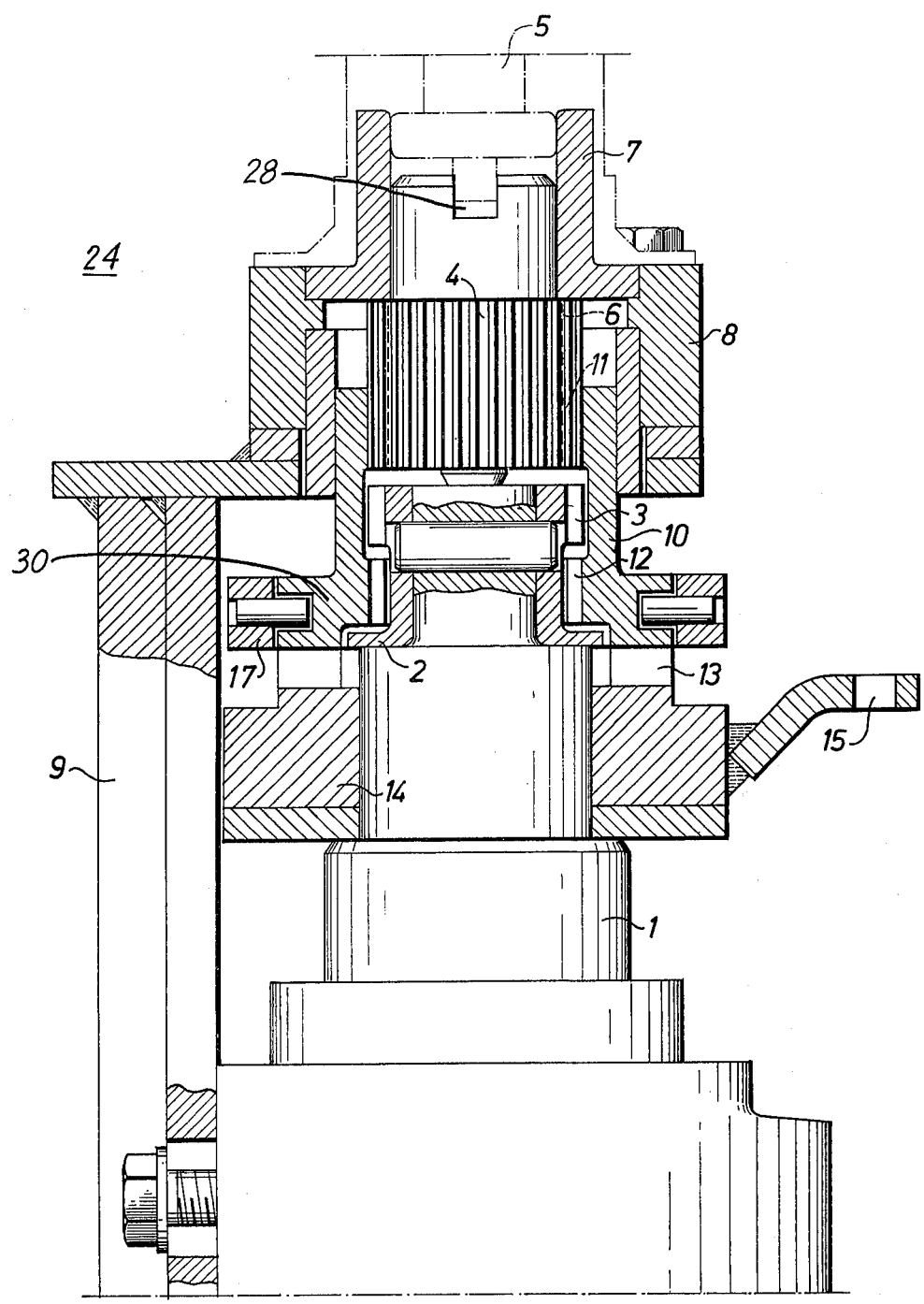

DEVICE FOR SHIFTING BETWEEN FINE AND COARSE STEERING OF VEHICLES COMPRISING A FRONT AND A REAR VEHICLE PART

FIELD OF THE INVENTION

The present invention relates to a device for shifting between fine and coarse steering operations of vehicles comprising front and rear vehicle parts articulately joined with each other. Hydraulic steering cylinders are disposed between said two vehicle parts for angular displacement of the vehicle parts relative to each other for accomplishing the steering of the vehicle, and a first valve is adapted to control the fluid flow to the steering cylinders in order to provide for the fine steering of the vehicle, while a second valve is adapted to control the fluid flow to the steering cylinders to provide for the coarse steering.

BACKGROUND OF THE INVENTION

In vehicles comprising a front and rear vehicle part which are joined together by means of a hinge mechanism, hydraulic steering cylinders are provided between the vehicle parts whereby the vehicle is steered by the vehicle parts being angularly displaced relative to each other by means of the steering cylinders. Such vehicles, which are so-called waist steered vehicles and which are driven on roads, as well as cross-country vehicles, for example forest tractors and other logging machines, are formed with two types of steering mechanisms, that is, a fine steering mechanism for road driving, and a coarse steering mechanism for cross-country driving.

For road driving, small and smooth steering deflections are required in most cases. For the control of the steering cylinders during this fine steering operation the vehicle is provided with a valve designed in a convenient manner and which is controlled by means of a steering wheel. This fine steering operation is also designed in such a manner that the steering deflection will be proportional to the angle of rotation of the steering wheel. The valve used for this purpose may be of the type described in J. L. Rau, Hydrostatic Steering with Power-Beyond Capability, SAE Transactions 740435, Earthmoving Industry Conference, Central Illinois Section, Peoria, Ill., Apr. 23–24, 1974.

For cross-country driving, on the contrary, when it is necessary to make one's way between various obstacles, such as trees, rocks, stumps etc., rapid and large steering deflections are required and it is necessary to facilitate rapid shifting between steering deflections to the left and to the right. The vehicle is then mostly steered by means of a lever which is coupled to a hydraulic valve for controlling the oil flow to the steering cylinders. This type of steering, that is, coarse steering, operates in such a way that, as long as the lever is actuated and the valve is open, oil will flow to the cylinders and the vehicle parts will be continuously displaced angularly relative to each other.

A disadvantage of this construction of the steering of the vehicle is that two separate actuators must be used for the fine and coarse steering operations, that is, a steering wheel and a lever, respectively.

OBJECTS OF THE INVENTION

The object of the present invention is to eliminate said disadvantage and this object is obtained by means of a device of the kind described above, which is characterized in that a shifting means, which is shiftable between two positions, is adapted in a first position to connect an actuator, that is, the steering wheel which, of course, is provided for the steering of the vehicle, to the first valve and in a second position to connect the actuator to the second valve, said shifting means and said valves being arranged so that, with the shifting means in the first position a mutual angular position, of the vehicle parts is obtained which is proportional to the movement of the actuator, and with the shifting means in the second position a continuous, angular displacement of the vehicle parts is obtained, as long as the actuator is moved from a predetermined initial position.

BRIEF DESCRIPTION OF THE DRAWINGS

An exemplary embodiment of the invention will now be described in detail below with reference to the accompanying drawings, of which FIG. 1 illustrates the steering system of a waist-steered vehicle with the shifting or coupling device according to the invention, and FIG. 2 illustrates the device according to the invention in a cross-section taken along the longitudinal axis.

DETAILED DESCRIPTION OF THE PREFERRED EMBODIMENT

In the embodiment of the steering device illustrated in FIG. 1, a shaft 5 extends downwardly from a steering wheel 22 to a shifting or coupling device 24 comprising the present invention, said device being disposed on a first steering valve 1 which is provided for the fine steering of the vehicle. This steering valve 1 is of the type, the principles of which are described in J. L. Rau, Hydrostatic Steering with Power-Beyond Capability, SAE Transactions 740435 Earthmoving Industry Conference, Central Illinois Section, Peoria, Ill., April 23–24, 1974, and marketed as TRW-valve or Orbitrol-valve. With the shifting means of the coupling device 24 shifted into a first position, the steering wheel 22 is connected to the shaft of the steering valve 1 via the shaft 5 and the device 24, the steering valve 1 controlling the fluid flow to the steering cylinders of the vehicle in response to the movement of the steering wheel 22 in such a manner that the steering deflection of the vehicle parts is proportional to the angle of rotation of the steering wheel 22.

The shifting means in the coupling device 24 is shiftable by means of a lever 18 and, with the shifting means in a second position, the steering wheel 22 is connected to a hydraulic valve 19 via the shaft 5, the coupling device 24, and an actuating cable 16. The actuating cable 16 is of the so-called push-pull type, that is, the actuating cable 16 is of the same type as that used for the choke of a motor car, but of a more sturdy construction. The actuating cable is connected to an actuating lever 26 of the hydraulic valve 19, whereby the hydraulic valve 19 is controlled in response to the movement of the steering wheel 22, as the coupling device is thus shifted for coarse steering. Thus, the fluid flow to the steering cylinders is controlled in response to the movement of the steering wheel 22, with the oil flowing to the steering cylinders, and the two vehicle parts being displaced angularly relative to each other, whenever the valve is open. The amount of the oil flow to the steering cylinders, and thereby the velocity with which the vehicle parts are angularly displaced, is determined by the degree of the opening of the hydraulic valve 19, that is, the magnitude of the rotary movement of the steering wheel 22.

FIG. 2 illustrates the shifting or coupling device 24 in cross-section taken along its longitudinal axis. On the shaft of the steering valve 1, a sleeve 2 is provided with teeth 3 fixedly mounted thereon. A shaft 4 provided at one end with a narrow stud, not numbered, is supported against the upper end of the shaft of the steering valve 1, and is provided at the opposite end with a groove 28, wherein the shaft 5 of the steering wheel 22 is secured. Axially extending teeth 6 are also provided on shaft 4 and it is seen that the upper end of shaft 4 is rotatably accommodated in a sleeve 7 which is secured in a coupling case 8 which, in turn, is disposed on the valve 1 by a means of an attachment 9. A coupling sleeve 10 is journalled in the coupling case 8, said coupling sleeve 10 having two internal sets of teeth 11 and 12. The first set of teeth 11, or gear ring, permanently engage the teeth 6 on the shaft 4 while the second set of teeth, or the second gear ring 12, is brought into engagement with the teeth 3 on the sleeve 2 when the coupling sleeve 10 is moved axially along the shaft 4.

The coupling sleeve 10 is formed at its lower end as a claw coupling, that is, it is formed with an external flange 30 with claws 13 which fit into recesses, not shown, in a ring 14. This ring 14 is rotatably journalled on the shaft of the steering valve 1. On this ring, an arm 15 is provided to which actuating cable 16 is connected. In order to displace the coupling sleeve 10 along the shaft 4, the coupling sleeve 10 is coupled to an operating lever 18 via a ring 17, see FIG. 1. The actuating cable 16 connected to the arm 15 is connected at its opposite end to the actuating lever 26 of the hydraulic valve 19 which controls the oil flow to the steering cylinders during coarse steering. Through means of a second actuating cable 20, said valve is also connected to a second lever 21 by means of which the driver can also steer the vehicle.

The device according to the invention operates in the following manner. When the coupling sleeve 10 is located in the position as illustrated in FIG. 2, the coarse steering is able to be accomplished. The movements of the steering wheel are then transferred via the shaft 5, the shaft 4, the teeth 6 and 11, sleeve 10, and the claw coupling 13 to the ring 14. Through means of the actuating cable 16 connected to the arm 15, the hydraulic valve 19 is operated upon turning of the steering wheel, thereby controlling the oil flow to the steering cylinders in response to the movement of the steering wheel 22 whereby the vehicle turns to the right or to the left. Whenever the steering wheel 22 is turned from an initial position, the hydraulic valve 19 is open and the vehicle parts are angularly displaced relative to each other. The magnitude of the turning of the steering wheel 22 from the initial position determines the velocity of the angular displacement of the vehicle parts.

When the vehicle is to be moved on a road and the driver wishes to accomplish fine steering, the coupling sleeve 10 is moved upwardly from the position of FIG. 2, by means of the operating lever 18, into its upper position whereby the claws 13 are released from their engagement with the ring 14 and the ring gear 12 now engages the teeth 3 on the sleeve 2. The steering wheel 22 is then coupled to the steering valve 1. The movement of the steering wheel 22 is thereby transferred directly to the input shaft of the steering valve 1 and a mutual angular position of the vehicle parts proportional to the magnitude of the turning of the steering wheel 22 will then be obtained at any moment. A substantial advantage of the device according to the invention is that the shifting between coarse and fine steering can be performed without the driver being required to remove more than one hand from the steering wheel and without the vehicle having to be stopped during the shifting operation.

In logging machines, for example, processors, the operator, during the limbing work, is seated with his back toward the direction of travel of the vehicle. Therefore, when the steering system described is utilized in such a machine, the operator steers the machine by means of the lever 21 (see FIG. 1) instead of by means of the steering wheel 22, when the machine is to be moved along the row of felled trees. It is obvious to a person skilled in the art that the arrangement of the device according to the invention can be varied in a plurality of different ways. Thus, for example, friction type couplings can be used instead of gear wheels for the transmission of the movement of the actuating member to the valves.

Instead of having the coupling sleeve 10 formed with claws and the ring rotatably journalled on the steering valve formed with recesses, the ring may be provided with claws and the coupling sleeve with matching recesses.

In the embodiment described, the arm 15, to which the actuating cable 16 is connected, performs a rotary movement together with the steering wheel 22. However, it is possible to modify this embodiment so that the movement of the steering wheel is converted into a movement of some other type of an arm.

These are just examples of variations of the design. Even in a plurality of other respects the device according to the invention can be modified and changed within the scope of the invention.

I claim:

1. A device for shifting between fine and coarse steering operations for vehicles comprising front and rear vehicle parts articulately joined with each other, hydraulic steering cylinders disposed between said two vehicle parts for angularly displacing the vehicle parts relative to each other for accomplishing the steering of the vehicle, a first valve being adapted to control the fluid flow to the steering cylinders in order to provide for the fine steering of the vehicle, and a second valve being adapted to control the fluid flow to the steering cylinders to provide for the coarse steering, the improvement comprising:
   a shifting means, which is shiftable between two positions and is adapted in a first position to connect an actuator, provided for the steering of the vehicle, to the first valve, and a second position to connect the actuator to the second valve,
   said shifting means and said valves being arranged so that with the shifting means in the first position, a mutual angular displacement of the vehicle parts is obtained which is proportional to the movement of the actuator, and with the shifting means in the second position, a continuous angular diaplacement of the vehicle parts is obtained as long as the actuator is moved from a predetermined initial position.

2. The device as claimed in claim 1, characterized in that the shifting means and the second valve are so arranged that the velocity of the angular displacement of the vehicle parts is determined by the displacement of the actuator from its initial position.

3. The device as claimed in claim 1, characterized in that the actuator is adapted to perform a rotary motion and that the shifting means comprises a rotatable shaft means connected to the actuator.

4. The device as claimed in claim 3, characterized in that the shifting means comprises a coupling sleeve which is mounted around the shaft means and is movable longitudinally thereof, said coupling sleeve being rotatably journalled and engaging the shaft means for transmission of the movement of the actuator to the coupling sleeve via the shaft device, the shifting of the shifting means being performed by displacement of the coupling sleeve.

5. The device as claimed in claim 4, characterized in that the coupling sleeve is connected to an operating lever by means of which the coupling sleeve is displaced at the shifting of the shifting means.

6. The device as claimed in claim 4, characterized in that the shifting means comprises a first member which, in the first position of the shifting means, is in engagement with the coupling sleeve and is then adapted to actuate the first valve in response to the movement of the coupling sleeve, and a second member which, in the second position of the shifting means, is in engagement with the coupling sleeve which is then adapted to actuate the second valve in response to the movement of the coupling sleeve.

7. The device as claimed in claim 3, characterized in that the shaft means is provided with external teeth over a portion extending in the longitudinal direction of the shaft means.

8. The device as claimed in claim 6, characterized in that the coupling sleeve has two internal gear rings, spaced relative to each other in the longitudinal direction of the shaft means, and is formed at one end with an external flange provided with claws, whereby for the transmission of the movement of the actuator, one gear ring of the coupling sleeve is in engagement with the teeth of the shaft means in both positions of the shifting means, while in the first position of the shifting means the second gear ring is in engagement with a toothed part of the first member, and in the second position of the shifting means, said claws are in engagement with recesses in a ring of the second member.

9. The device as claimed in claim 1, characterized in that the second valve is a hydraulic valve.

10. The device as claimed in claim 8, characterized in that the toothed part of the first member is a sleeve with external teeth fixedly mounted on the shaft of the steering valve.

11. The device as claimed in claim 8, characterized in that the ring of the second member is rotatably journalled on the shaft of the steering wheel.

12. The device as claimed in claim 11, characterized in that the ring provided with recesses is connected to an arm which is connected to the actuating lever of the hydraulic valve via a cable.

13. The device as claimed in claim 12, characterized in that a lever operable by the driver of the vehicle is directly connectable to the actuating lever of the hydraulic valve via a second cable.

14. The device as claimed in claim 3, characterized in that the shaft means is rotatably journalled in a bearing sleeve which is mounted in a housing enclosing the shifting means, said housing, in turn, being mounted on the steering valve.

15. The device as claimed in claim 3, characterized in that the shaft means comprises a stud supported against the shaft of the steering valve.

16. The device as claimed in claim 1, characterized in that the actuator is a steering wheel fixedly connected to the shaft means.

* * * * *